May 3, 1932.  R. R. OSBORN  1,856,080
AEROPLANE WING STRUCTURE
Filed March 26, 1929  3 Sheets-Sheet 1
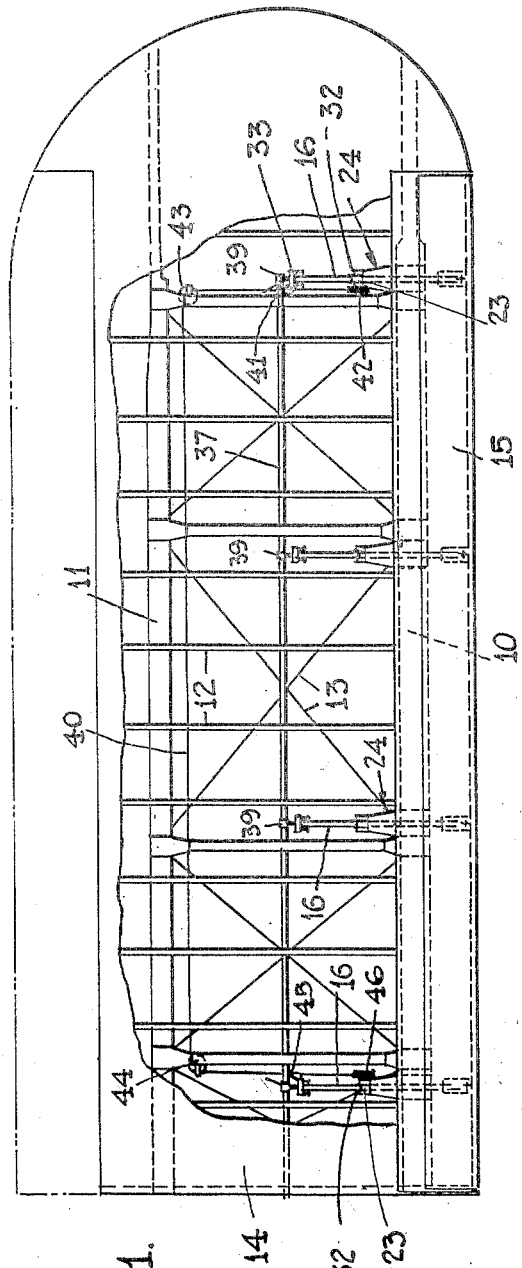
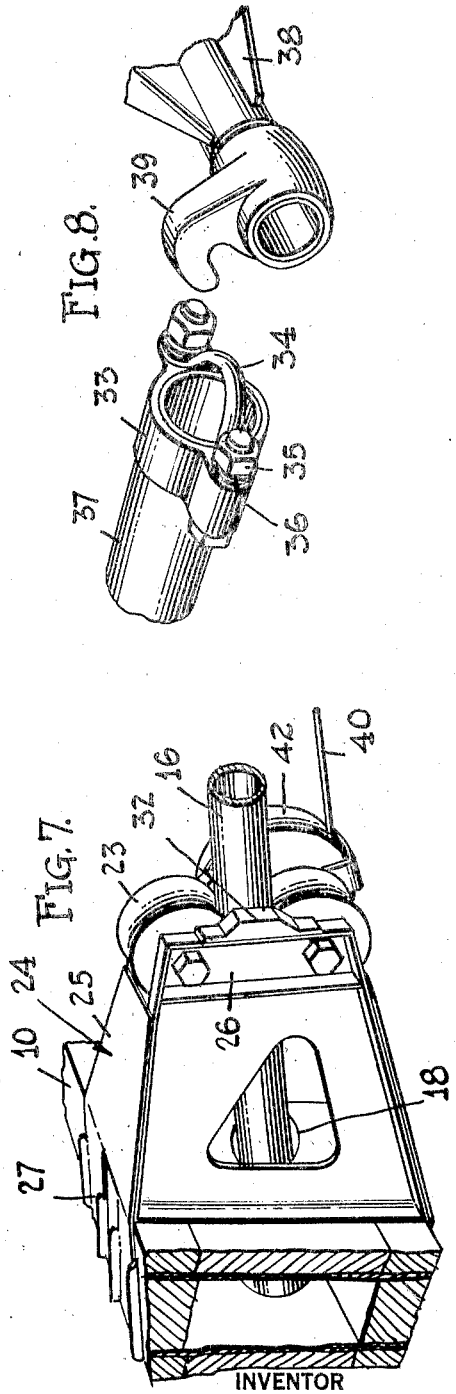
INVENTOR
ROBERT R. OSBORN.
BY
ATTORNEY

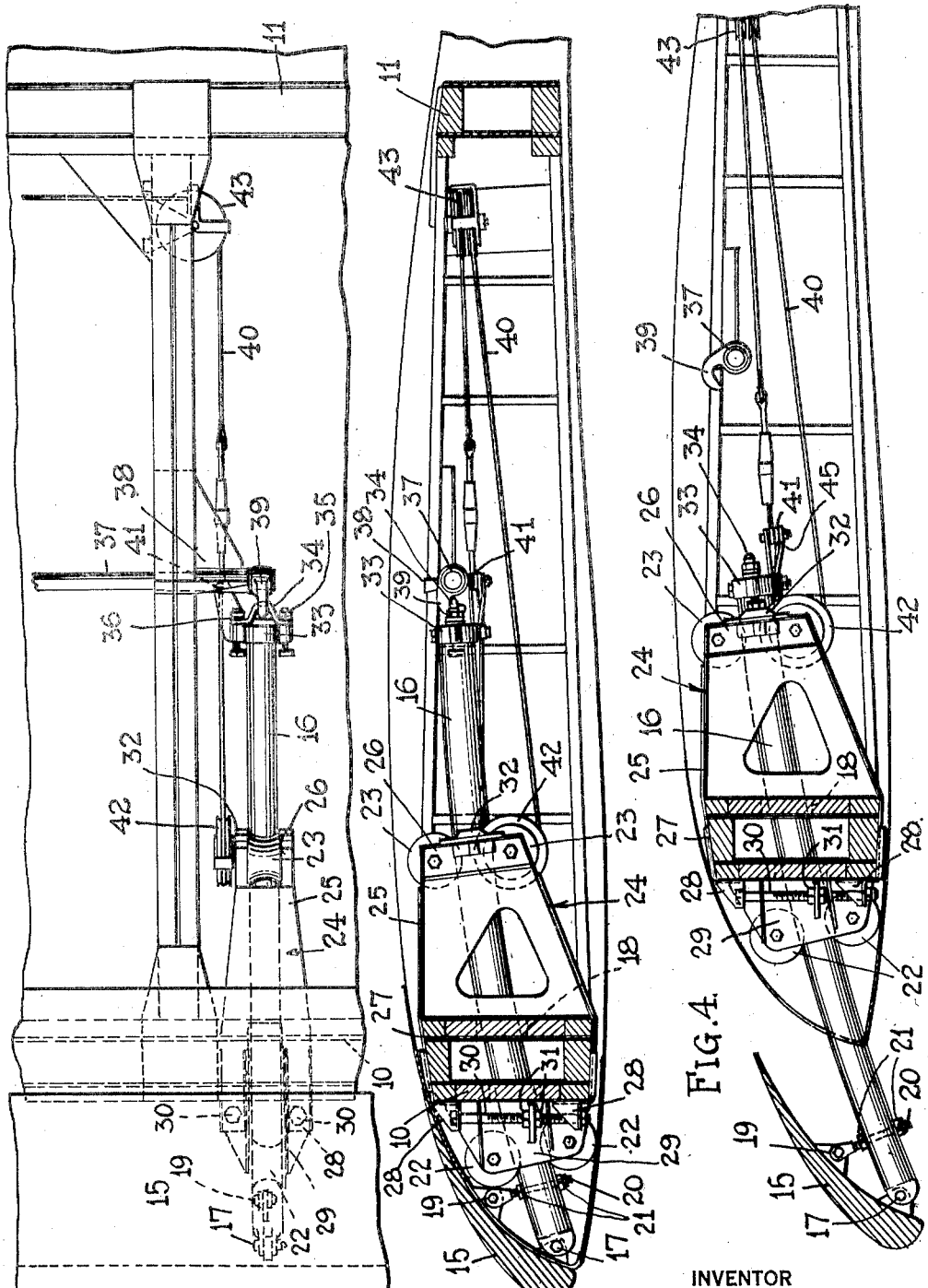

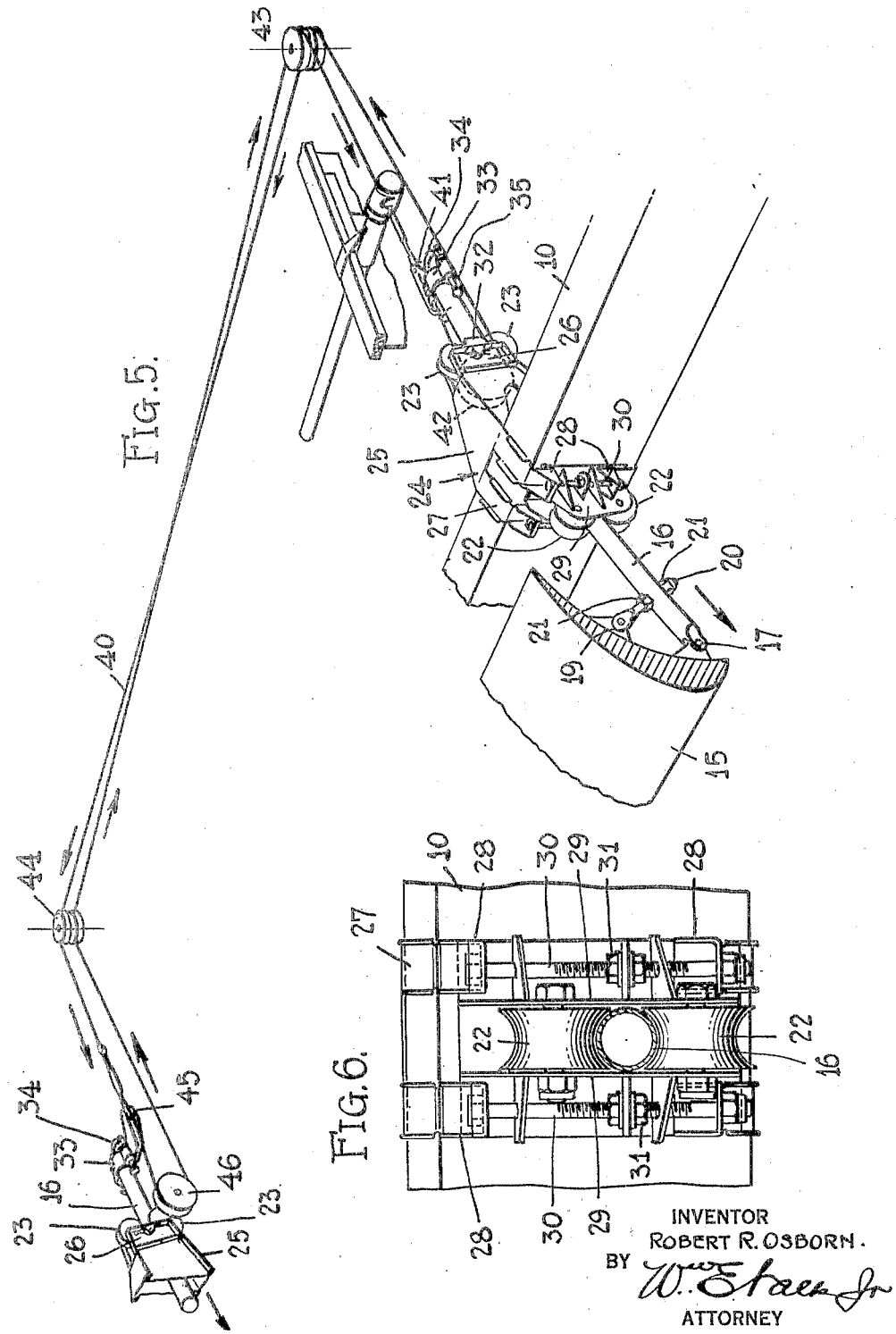

Patented May 3, 1932

1,856,080

UNITED STATES PATENT OFFICE

ROBERT R. OSBORN, OF GARDEN CITY, NEW YORK, ASSIGNOR TO CURTISS AEROPLANE & MOTOR COMPANY, INC., A CORPORATION OF NEW YORK

AEROPLANE WING STRUCTURE

Application filed March 26, 1929. Serial No. 349,927.

My invention relates to wing structures for aeroplanes and more particularly to slotted aeroplane wings, i. e., wings including a wing structure main wing and a wing structure auxiliary wing, the latter being movable to provide, under certain operating conditions, a transversely extending open slot within and adjacent to the leading edge of the wing.

An object of the invention is to provide an improved mounting for the wing structure auxiliary wing whereby its longitudinal adjustment is rendered positive and unfailing; said mounting, in the preferred embodiment of the invention, comprising a plurality of arcuate support arms, ball bearing roller supports by means of which said arms are guided during wing adjustment, simplified adjustments for varying the angle of incidence of said auxiliary wing as well as its vertical position with respect to the leading edge of said main wing, means for maintaining said auxiliary wing at all times in parallelism with said main wing, means for absorbing shocks due to the sudden forward movement of said auxiliary wing, and means for locking said auxiliary wing in its retracted position, and for releasing it when and as desired.

Other objects and advantages of the invention, likewise of a structural nature, will be hereinafter more particularly set forth.

In the drawings, wherein like reference characters denote like or corresponding parts, Fig. 1 is a plan view of a wing unit constructed in accordance with the present invention; a portion of the wing covering being broken away;

Fig. 2 is a plan view of a portion of the wing structure with the wing section auxiliary wing retracted and locked;

Fig. 3 is a sectional view showing that part or portion of the wing structure illustrated in Fig. 2;

Fig. 4 is a view similar to Fig. 3; the wing section auxiliary wing being shown extended;

Fig. 5 is a perspective view of the cable connection extending longitudinally of the wing and fastened to the auxiliary wing for maintaining parallel relation between it and the wing section main wing;

Fig. 6 is a face view of the forward roller mounting;

Fig. 7 is a perspective view of the rear roller mounting, and

Fig. 8 is a perspective view of the lock means by which the auxiliary wing is locked in its retracted position.

The wing structure main wing, in its preferred embodiment, comprises a forward wing beam 10, a rear wing beam 11, and such other conventional structural wing frame members as ribs 12, brace wires 13, wing covering 14, etc. Fastened to said wing section main wing, and adjustable or movable toward and from the leading edge thereof, is the wing section auxiliary wing 15. Movements of said auxiliary wing are entirely automatic and are brought about thru aerodynamic reasons now well known.

The means for supporting the auxiliary wing 15 in the position indicated comprises a plurality of arcuate support arms 16, each of which at its forward end, is pivotally fastened as at 17 to the auxiliary wing, and at its opposite end, is let thru the forward wing beam 10, suitable openings 18 being formed in said wing beam for this purpose. To the end that said auxiliary wing may be adjusted as to angle of incidence, the pivot point 17 of each support arm is located adjacent to the leading edge of said auxiliary wing, and said auxiliary wing at a point behind and above its leading edge has pivotally fastened thereto as at 19 a plurality of link bolts 20, one for each support arm. As indicated in Fig. 5, the link bolts 20 penetrate the support arms and have mounted thereon nuts 21—21 by means of which the link bolts are locked and adjusted. By varying the effective length of the link bolts 20 the angular position of the auxiliary wing 15 with respect to the main wing may be adjusted as desired.

The support arms 16 are both held for sliding movement as well as against axial play by means of two sets of ball bearing rollers designated respectively 22 and 23. The rollers 22 are preferably vertically adjustable, whereas the rollers 23 are preferably fixed. As a support for the two sets of rollers, a master fitting 24 is provided. Said fitting (see Fig. 7) comprises a rearwardly extending portion 25 provided at its rear end with ears 26 between which the rollers 23 are mounted. At its forward end said rearwardly extending portion 25 bears squarely against the rear face of the forward wing beam 10 and the support arm 16 which penetrates the beam 10 at the point of fitting attachment passes entirely thru its extended length. At the top and bottom of said beam, straps 27 are provided, the straps in each instance, being carried forwardly to overhang the forward face of the beam, and by means of brackets 28—28 formed on the strap ends, provide upon the forward face of said beam a retaining means for an adjustable fitting 29 upon which the forward roller bearings 22 are mounted. Said bracket 29, by means of adjustable screws 30—30 and lock nuts 31, is held in its adjusted position. As the rollers 22 are carried by said bracket 29, obviously any adjustment accorded said bracket is imparted to the support arm extending therethru, which adjustment is in turn imparted to the wing section auxiliary wing 15 that its leading edge may be raised and lowered (within certain limits) as desired. A fitting thus formed not only provides for the desired spacing of the roller bearings, but it acts also as a means for reinforcing the forward wing beam at the point or points where the openings 18 are provided.

To take care of shocks due to the more or less sudden forward movement of the auxiliary wing 15, shock absorbers 32 are provided at the inner extremities of the rear extensions 25 of the several fittings. As herein illustrated each shock absorber consists of a pair of rubber blocks positioned one at each side of the rear rollers 23 in the direct path of movement of the support arms 16. The support arms 16 carry at their inner ends abutment fittings 33, the lateral portions of which directly bear on the shock absorbers 32 in the extended position of the auxiliary wing. Said fittings 33 also carry eye-ends 34 bolted as at 35 to the laterally projecting fitting portions. The purpose of such eye-end fittings will be later disclosed. As a means of adjustment, one or more shims 36 may be used to vary the distance between the abutment fittings and the shock absorbers 32. By thus varying the distance between the parts mentioned the extent to which the auxiliary wing may be projected forwardly may be varied.

Since it is quite desirable under certain operating conditions to lock the auxiliary wing in its retracted position, a suitable lock means is provided, the operation of which lock means is preferably controlled from the pilot's seat. A torque tube or shaft 37 extends lengthwise the wing structure and is mounted in suitable bearings 38. In longitudinal alignment with each support arm 16 said tube or shaft 37 has mounted thereon appropriate hook fittings 39 which are adapted to engage with the eye-ends 34 at the inner arm ends. With the auxiliary wing retracted, the hook fittings 39 may be rotated to engage the eye-ends to thus prevent the outward or forward extension of the auxiliary wing.

It has further been found in practice that it is quite desirable to provide a means for maintaining the auxiliary wing at all times in parallelism with the leading edge of the main wing. This is particularly true where the leading edge of the main wing, and hence the auxiliary wing, is provided with a sweepback at its leading edge. That this parallel motion device may be made as light and simple as possible, an endless cable 40 is provided. Said cable, throughout the major portion of its length, extends lengthwise the wing and is preferably fastened to certain of the support arms which are distantly removed one from the other. Said cable is fastened to one said support arm as at 41. From its point of attachment at 41 it extends forwardly over a pulley 42 carried by one of the fittings 24, thence rearwardly to a pulley 43. From said pulley 43 the cable extends longitudinally of the wing to a third pulley 44, from which point it is carried forwardly to a point of attachment to a second or the distantly removed support arm where it is fastened as at 45. From said point of attachment at 45 the cable extends forwardly to a pulley 46 mounted on the fitting 24 thru which the last mentioned support arm extends, and thence back again over the pulleys 44 and 43 to its point of beginning at 41. The cable 40 is thus endless and no matter what forces are brought to bear on the auxiliary wing in its automatic operation, its movement is equalized and said wing is at all times held parallel to the leading edge of the main wing.

It will be observed from the foregoing that angular adjustment as well as vertical adjustment of the auxiliary wing 15 may be effected; that the entire hook-up may be installed on conventional wing structures without substantial modification; and that provision is made for the locking of the auxiliary wing in its retracted position. Moreover, substantially the entire mechanism is enclosed within the confines of the main wing.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an aeroplane wing structure, a wing section main wing including as a structural element thereof a wing beam, a longitudinally adjustable wing section auxiliary wing mounted in advance of the leading edge of said main wing, a support arm pivotally fastened at its forward end to said auxiliary wing, said support arm being carried thru said wing beam at its opposite end, a fitting wrapped around and extending rearwardly beyond said wing beam, non-adjustable rollers carried by the rearwardly extending portion of said fitting, and adjustable rollers carried by that portion of said fitting extending forwardly of said wing beam, said rollers, in each instance, being directly engagable with said support arm to guide and hold it, and hence the auxiliary wing, both during and in all positions of adjustment, and said adjustable rollers being vertically adjustable to vary the angular position of said support arm, and hence the vertical position of said auxiliary wing in its relation to said main wing.

2. In an aeroplane wing structure, a wing section main wing, an angularly adjustable wing section auxiliary wing mounted in advance of the leading edge of said main wing, a support arm slidably mounted in said wing section main wing and to which said auxiliary wing is pivotally fastened at a point in the vicinity of its leading edge, and adjustable means carried by said support arm and pivotally fastened to said auxiliary wing at a point remote from its point of attachment to said support arm.

3. In an aeroplane wing structure, a wing section main wing, an angularly adjustable wing section auxiliary wing mounted in advance of the leading edge of said main wing, a support arm to which said auxiliary wing is pivotally fastened, a link connection between said support arm and said auxiliary wing, and means for varying the effective length of said link connection.

4. In an aeroplane wing structure, a wing section main wing, a wing section auxiliary wing mounted in advance of the leading edge of said main wing, said auxiliary wing being movable automatically under the influence of changes in air pressures from a retracted position close up against the leading edge of said main wing to an extended position spaced forwardly thereof, support arms to which said auxiliary wing is fastened and by means of which it is guided in its movement, and a flexible interconnection between certain of said support arms for correlating the movements thereof during such wing adjustment.

5. In an aeroplane wing structure, a wing section main wing, a wing section auxiliary wing mounted in advance of the leading edge of said main wing, said auxiliary wing being movable automatically under the influence of changes of air pressures from a retracted position close up against the leading edge of said main wing to an extended position spaced forwardly thereof, and flexible means extending from one point to another along the length of said auxiliary wing for maintaining it in parallel relation to the leading edge of said main wing in all positions of auxiliary wing adjustment.

6. In an aeroplane wing structure, a wing section main wing, a wing section auxiliary wing mounted in advance of the leading edge of said main wing, said auxiliary wing being movable from a retracted position close up against the leading edge of said main wing to an extended position spaced forwardly thereof, and an endless cable connection extending from one point to another along the length of said auxiliary wing for maintaining it in parallel relation to the leading edge of said main wing in all positions of auxiliary wing adjustment.

7. In an aeroplane wing structure, a wing section main wing, a wing section auxiliary wing mounted in advance of the leading edge of said main wing, said auxiliary wing being movable from a retracted position close up against the leading edge of said main wing to an extended position spaced forwardly thereof, a support arm for said auxiliary wing, said support arm being carried at its rear end well within said main wing, a manually rotatable shaft extending into said main wing at substantially a right-angle to said support arm, and means carried by said shaft to engage and releaseably lock said support arm, and hence said auxiliary wing in its retracted position of adjustment.

8. In an aeroplane, a main wing, an auxiliary wing, means for slidably supporting said auxiliary wing upon said main wing for movement away from and toward said main wing whereby a slot may be opened and closed adjacent to the leading edge of the combined airfoil, means for moving the nose of said auxiliary wing to vary the relative height thereof with reference to the main wing, and means for varying the angle of the auxiliary wing with respect to the main wing.

9. In an aeroplane wing structure, a wing section main wing having a forward wing beam, a wing section auxiliary wing mounted at the leading edge of said main wing and adapted to move toward and from said leading edge of the main wing to provide a slot between the auxiliary wing and the main wing at selected times, a set of roller bearings mounted upon said wing beam and disposed adjacent the forward face thereof, a second set of roller bearings mounted upon said wing beam and disposed adjacent the rear face thereof, one roller bearing of each set being disposed above its cooperating roller bearing, and an arcuate supporting arm for said auxiliary wing extending through said beam and adapted to move fore and aft between the cooperating roller bearings of each set, whereby said arm is guided and supported by said roller bearings.

10. In an aeroplane wing structure, a wing section main wing having a forward wing beam, a wing section auxiliary wing mounted at the leading edge of said main wing and adapted to move toward and from said leading edge of the main wing to provide a slot between the auxiliary wing and the main wing at selected times, a set of roller bearings mounted upon said wing beam and disposed adjacent the forward face thereof, a second set of roller bearings mounted upon said wing beam and disposed adjacent the rear face thereof, one roller bearing of each set being disposed above its cooperating roller bearing, and an arcuate supporting arm for said auxiliary wing extending through said beam and adapted to move fore and aft between the cooperating roller bearings of each set, whereby said arm is guided and supported by said roller bearings, said bearings being disposed at all times within the main wing and said arm being disposed within the main wing when the auxiliary wing is in its retracted position.

11. In an aeroplane wing structure, a wing section main wing, a wing section auxiliary wing mounted in advance of the leading edge of said main wing, said auxiliary wing being movable from a retracted position close up against the leading edge of said main wing to an extended position spaced forwardly thereof, a support for said auxiliary wing slidably mounted in said wing section main wing, a torque tube carried by said main wing, a hook mounted upon said tube, and an eye-end carried by said support and adapted to receive said hook to lock the auxiliary wing in its retracted position.

In testimony whereof I hereunto affix my signature.

ROBERT R. OSBORN.